United States Patent [19]
Takagi et al.

[11] Patent Number: 4,721,388
[45] Date of Patent: Jan. 26, 1988

[54] METHOD OF MEASURING SHAPE OF OBJECT IN NON-CONTACTING MANNER

[75] Inventors: Yusuke Takagi; Yoshio Kojima; Kazuo Moriguti; Tsunehiko Takakusagi, all of Hitachi, Japan

[73] Assignee: Hitachi, Ltd., Tokyo, Japan

[21] Appl. No.: 784,501

[22] Filed: Oct. 4, 1985

[30] Foreign Application Priority Data

Oct. 5, 1984 [JP] Japan ................................. 59-208244

[51] Int. Cl.⁴ .............................................. G01B 11/24
[52] U.S. Cl. ...................................... 356/376; 356/394
[58] Field of Search ................ 356/375, 376, 388, 394; 364/506, 507, 559, 560, 561

[56] References Cited

U.S. PATENT DOCUMENTS 3,633,010 1/1972 Svetlichny ............................ 364/507

FOREIGN PATENT DOCUMENTS 113691 7/1984 European Pat. Off. ............. 356/376
164303 12/1980 Japan ................................. 356/376
80510 5/1983 Japan ................................. 356/394
190607 10/1984 Japan ................................. 356/376

Primary Examiner—F. L. Evans
Attorney, Agent, or Firm—Fay, Sharpe, Beall, Fagan, Minnich & McKee

[57] ABSTRACT

This invention relates to a method of measuring the shape of an object in a non-contacting manner. The method comprises the steps of providing reference points on the object, the coordinates of which are known in an object coordinate system for expressing the shape of the object; applying a light spot on the reference points while moving a light spot detecting sensor to determine the coordinate values in a measuring coordinate system; determining the relative positional relation between the two coordinate systems by using coordinate values thus determined and the coordinate values in the object coordinate system; measuring points on the object to measure the shape of the object; and comparing the coordinate values, relating to shape of the object and determined in the measuring coordinate system, with reference values which are design values modulated with the relative positional value and converted into coordinate values in the measuring coordinate system in an arithmetic control unit, whereby a manufacturing error of said object is measured.

11 Claims, 7 Drawing Figures

METHOD OF MEASURING SHAPE OF OBJECT IN NON-CONTACTING MANNER

BACKGROUND OF THE INVENTION

This invention relates to a method of measuring the shape of an object by a light spot detecting sensor using the light, such as a laser beam, and more particularly to a method of measuring the shape of an object in a non-contacting manner, which is capable of simply measuring a manufacturing error of an object.

Owing to the recent, rapid development of the opto-electronics, a shape-measuring apparatus provided with a light spot detecting sensor utilizing a laser beam for the measurement of the shape of an object has been developed. An example of such an apparatus is described in, for example, "Techniques for Sensor", February 1983 issue, paragraph "Measurement of Shape of Object by Light Spot Detecting Sensor", PP60 to 64.

This type of apparatus is used mostly for measuring the shape of an object after the object has been manufactured, and comparing this shape with the designed shape thereof to discuss a manufacturing error. In order to carry out this comparison, it is necessary to grasp in advance the relative positional relation between the object coordinate system in which the design values are defined and the shape-measuring coordinate system of the apparatus.

SUMMARY OF THE INVENTION

An object of the present invention is to measure a manufacturing error of an object simply and automatically on the basis of the results of an operation for measuring the relative positional relation between an object coordinate system and a shape-measuring coordinate system.

In order to achieve the above object, the present invention provides a method of measuring the shape of an object, which is adapted to grasp the relative positional relation between an object coordinate system and a shape-measuring coordinate system by utilizing not only the function of a light spot detecting sensor of measuring a distance but also the function of the same of applying a visible light spot to the surface of the object, and measure a manufacturing error automatically by computation.

The characteristics of the present invention reside in a method of measuring the shape of an object in a non-contacting manner by using a shape-measuring apparatus comprising a light spot detecting sensor for measuring the distance between the object and sensor in a non-contacting manner by using light, a means for varying the angle of emission of the light from the light spot detecting sensor, a means, which has the angle-varying means secured thereto, and which is adapted to drive the light spot detecting sensor, and an arithmetic and control unit adapted to receive signals representative of the distance measured by the light spot detecting sensor, the amount of movement of the sensor driven by the three-dimensional driving means and the angle of emission of the light from the sensor, subject the signals to computation and control the operations of the sensor and driving means, said method comprising the steps of obtaining the relation between an object coordinate system for determining the shape of said object and a measuring coordinate system for determining the movement of said shape-determining apparatus, said relation obtaining step including the steps of providing one or a plurality of reference points, of which the coordinates in said object coordinate system are already known, on an object, driving said light spot detecting sensor so as to apply a light spot therefrom to said reference points and thereby determine the coordinate values in said measuring coordinate system of said reference points, and determining the relative positional relation between said two coordinate systems by said arithmetic control unit by using the coordinate values thus determined and the coordinate values in said object coordinate system; and measuring the distances of various points on the object by the light spot detecting sensor to determine the coordinate values of the various points on the object in the measuring coordinate system; and comparing the coordinate values obtained in the measuring step with design values in the object coordinate system corresponding to various points on the object which have been supplied to the arithmetic and control unit in advance, with the coordinate value or design values being converted into coordinate values in the same coordinate system by using the positional relation before the comparison, to determine a manufacturing error of said object.

DESCRIPTION OF THE PREFERRED EMBODIMENTS

An embodiment of the present invention will now be described with reference to the drawings.

Figure 1:
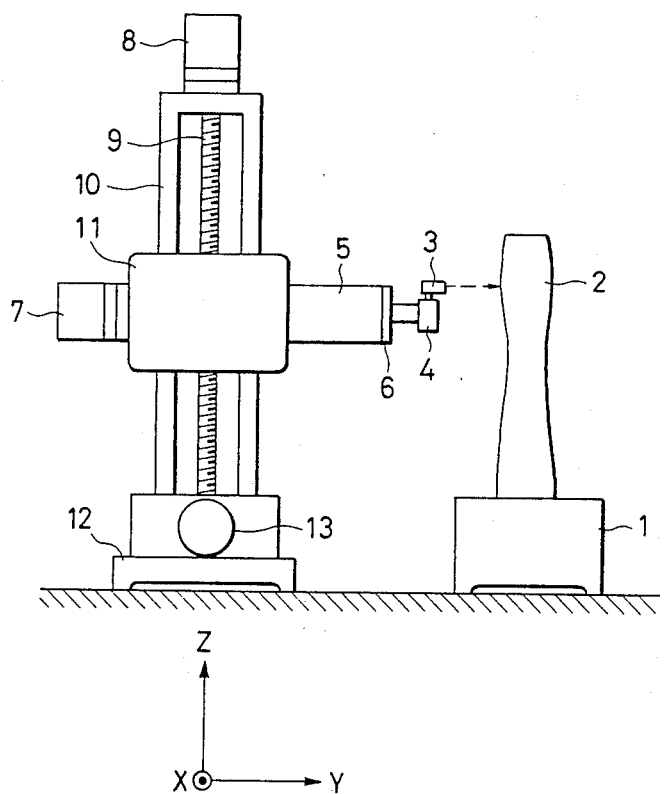
FIG. 1 is a front view of a shape measuring apparatus.
Figure 2:
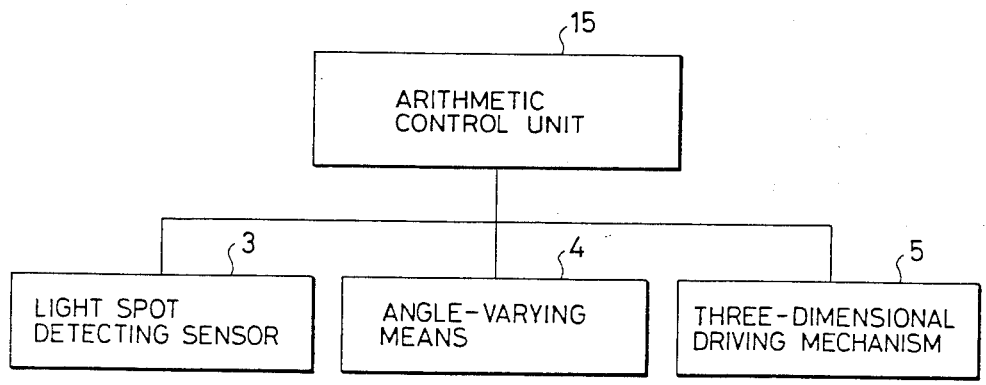
FIG. 2 is a block diagram of the shape measuring apparatus.

FIG. 1 shows a shape-measuring apparatus as a whole used in the embodiment, and FIG. 2 shows a block diagram of the whole shape-measuring apparatus.

In FIG. 1, a light spot detecting sensor 3 utilizing a laser beam is disposed in opposition to an object 2, the shape of which is to be measured, placed on a fixed block 1. This light spot detecting sensor 3 is joined to a mounting portion 6 of a three-dimensional driving means 5 via an angle-varying means 4. This mounting portion 6 is formed so that it can be driven in the direction of Y-axis (lateral direction) in the drawing by a motor 7. The light spot detecting sensor 3 is driven in the direction of Z-axis (vertical direction) by a vertical feed screw 9 connected to a motor 8 and a gear box 11 slidably fitted around an arm 10. The driving of the light spot detecting sensor 3 in the direction of X-axis (direction perpendicular to the surface of the drawing)

is done by moving the three-dimensional driving means as a whole, which is mounted on a base 12, by a motor 13. Accordingly, the light spot detecting sensor 3 can be moved three-dimensionally (in the directions of X, Y and Z-axes) around the object 2, and is capable of varying the angle of the light, which is emitted therefrom as shown by a broken arrow in the drawings, in accordance with the shape of the object 2 by the angle-varying means 4.

As shown in FIG. 2, the light spot detecting sensor 3, the angle-varying means 4 and the three-dimensional driving means 5 are electrically connected to an arithmetic control unit 15 which processes data from the above-mentioned means to determine the shape of the object 2, which will be described later.

Figure 3:
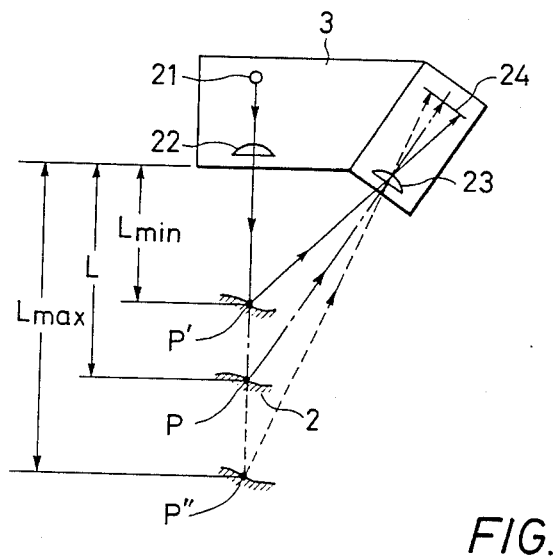
FIG. 3 is a schematic diagram of a light spot detecting sensor.

FIG. 3 roughly shows the construction of the light spot detecting sensor 3. A laser beam is emitted from a light source 21, and advances along the axis of the emitted light through an irradiation lens 22 to form a light spot on a point P on the surface of the object 2. The reflected light from the point P is condensed by a condenser 23, which is disposed on the axis of the receiving light, which extends at a predetermined angle to the axis of the emitted light, and the resultant light is detected by a light position sensitive detector (PSD) 24. A distance measuring operation is carried out on the basis of the following principle. When the distance L between the object 2 and the light spot detecting sensor 3 varies to a distance Lmin or Lmax between the sensor 3 and a point P' or a distance Lmax between the sensor 3 and a point P'', the light-receiving position on the light position sensitive detector 24 varies, this variation being electrically detected to generate electric signals corresponding to the distance. The light spot detecting sensor 3 has not only the function of measuring the distance between itself and an object but also the function of applying a visible light spot on the surface of the object so that the light spot can be easily focussed on the reference points made on the object.

Figure 4:
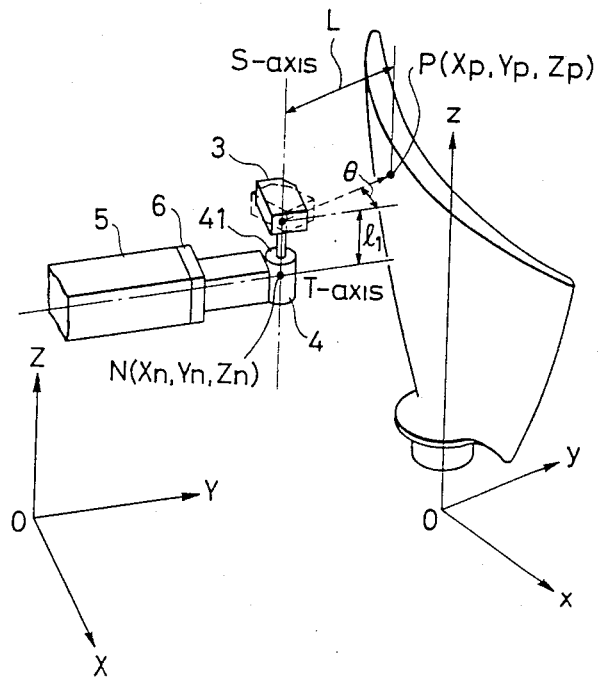
FIG. 4 is a perspective view of a part of the shape measuring apparatus and an object, for explaining the principle of measuring the shape of the object.

A method of measuring the shape of an object will now be described with reference to FIG. 4. The irradiation axis, shown by a broken arrow, of the light spot detecting sensor 3 can be turned around S-axis by a motor 41 fixed to the angle-varying means 4. The angle-varying means 4 is mounted on the three-dimensional driving means 5 by combining the flange type mounting portion 6 therewith. These constituent parts are disposed on the T-axis shown in the drawing. The S-axis and T-axis are provided in parallel with Z-axis and Y-axis, respectively, of the three-dimensional driving means 5.

In the embodiment constructed as mentioned above, the shape of the object 2 is determined by three factors, i.e. the driving position of the three-dimensional driving means 5, the angle of rotation of the angle-varying means 4 and the measurement value of distance measured by the light spot detecting sensor 3. Let $(X_N, Y_N, Z_N)$, $l_1$, $\theta$ and L equal the coordinate of an intersection N, which indicates the driving position of the three-dimensional means 5, of the T- and S-axes, the distance between the point N and optical shaft of irradiation, the angle of rotation of the angle-varying means and the measurement value of distance measured by the light spot detecting sensor 3, respectively. The coordinates $(X_P, Y_P, Z_P)$ of the light spot P on the surface of the object 2 can then be determined in accordance with the following equations.

$$\left. \begin{array}{l} X_p = X_N - L\sin\theta \\ Y_p = Y_N + L\cos\theta \\ Z_p = Z_N + l_1 \end{array} \right\} \quad (1)$$

Therefore, when the computation is made in accordance with the equations (1) by an arithmetic control unit 15 to determine the coordinate of the light spot P at required intervals as the light spot detecting sensor 3 is driven around the object, it is understood that the shape of the object can be expressed by an aggregate of the coordinates of these light spots.

The shape data thus obtained are the data in the measuring coordinate system, O-XYZ shown in the drawing, by which the movement of the three-dimensional driving means 5 is controlled. On the other hand, the shape of a mechanically processed object is expressed in its own object coordinate system, O-xyz. Accordingly, in order to determine the shape of such an object and ascertain that the object is processed in accordance with the design values, it is necessary to determine the relative positional relation between the above two coordinate systems, that is, determine the linkage of the coordinates, convert the values in one coordinate system into the values in the other and compare the values in the same coordinate system.

According to the apparatus used in the present invention, the linkage of these coordinate systems is determined in the following procedure.

(1) One to three reference points, of which the coordinate values in the object coordinate system are already known, are set.

(2) The coordinate values of these reference points in the measuring coordinate are determined. To be concrete, the three-dimensional driving means 5 and angle-varying means 4 are driven to apply a light spot from the light spot detecting sensor 3 to these reference points.

(3) The coordinate values in these two coordinate systems with respect to the reference points are inputted into the arithmetic control unit 15 to determine the relative positional relation between the two coordinate systems.

A concrete linking method with respect to the case where one to three reference points are set will now be described with reference to the drawings.

Figure 5:
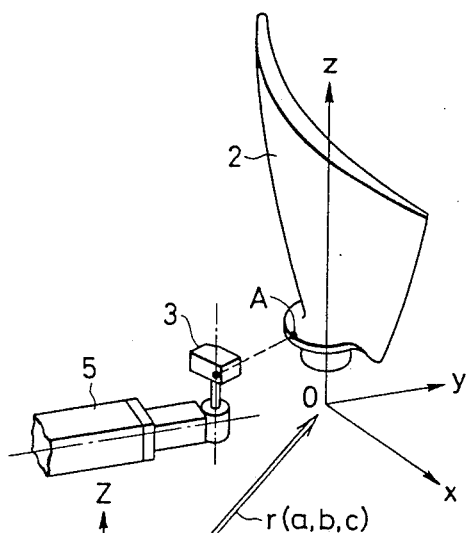
FIG. 5 is a perspective view of the part of the shape measuring apparatus and an object, for explaining an embodiment of the present invention in which one reference point is set.

FIG. 5 shows the case where only one reference point A is required since the coordinate axes in the object coordinate system O-xyz are set parallel to those in the measuring coordinate system O-XYZ. Let r(a, b, c) equal the quantity of translational motion. The following relative equations can then be established by using a coordinate conversion matrix.

$$\begin{pmatrix} X \\ Y \\ Z \\ 1 \end{pmatrix} = \begin{pmatrix} 1 & 0 & 0 & a \\ 0 & 1 & 0 & b \\ 0 & 0 & 1 & c \\ 0 & 0 & 0 & 1 \end{pmatrix} \begin{pmatrix} x \\ y \\ z \\ 1 \end{pmatrix} \quad (2)$$

Let $(x_A, y_A, z_A)$ and $(X_A, Y_A, Z_A)$ equal the coordinates in the object coordinate system of the reference point A set in an arbitrary position on the object 2, and the coordinates in the measuring coordinate system obtained by applying a light spot to the object, respectively. If the equation (2) is substituted by these numerical values, the unknown quantities (a, b, c) of translational motion can be determined easily. Namely, it is understood that the relative positional relation between the object coordinate system and measuring coordinate system can be determined.

Figure 6:
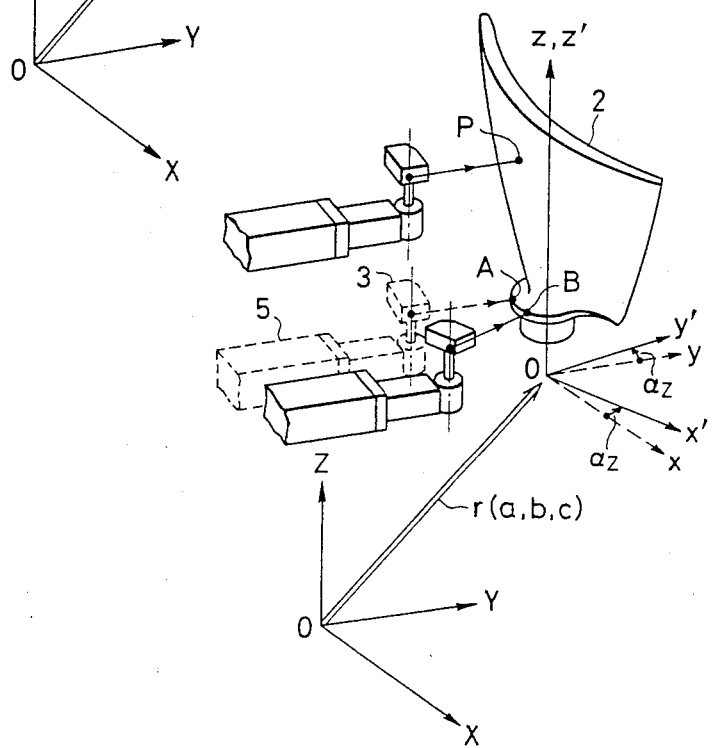
FIG. 6 is a perspective view of the part of the shape measuring apparatus and an object, for explaining another embodiment of the present invention in which two reference points are set.

How to set an object in the case where only one coordinate axis in the object coordinate system is parallel to the corresponding coordinate axis of the measuring coordinate system with two different reference points required to determine the linkage of these coordinate systems will now be discussed. FIG. 6 shows an example of this case, where z-axis of an object coordinate system is parallel to Z-axis of a measuring coordinate system with the x- and y-axes turned by $\alpha_z$ around the z-axis. In this case, the following equations are established between the object coordinate system O-x'y'z' and measuring coordinate system O-XYZ.

$$\begin{pmatrix} X \\ Y \\ Z \\ 1 \end{pmatrix} = \begin{pmatrix} \cos\alpha_z & -\sin\alpha_z & 0 & a \\ \sin\alpha_z & \cos\alpha_z & 0 & b \\ 0 & 0 & 1 & c \\ 0 & 0 & 0 & 1 \end{pmatrix} \begin{pmatrix} x' \\ y' \\ z' \\ 1 \end{pmatrix} \quad (3)$$

The equations (3) include four unknown values, i.e. the quantities (a, b, c) and the angle $\alpha_z$ of rotation. Therefore, setting only one reference point for determining the linkage of these coordinate systems is not sufficient; two points A, B shown in the drawing are required. Let $(x_A, y_A, z_A)$, $(x_B, y_B, z_B)$; and $(X_A, Y_A, Z_A)$, $(X_B, Y_B, Z_B)$ equal the coordinates in the object coordinate system of these points A, B, and the coordinates in the measuring coordinate system obtained by applying a light spot to the surface of the object, respectively. A total of six relative formulae can be obtained from the equations (3). If these formulae are united and solved, the four unknown values can be determined. Namely, it is understood that the relative positional relation between the object coordinate system and measuring coordinate can be determined. Even when a pair of parallel axis are other than the z- and Z-axes, the linkage of these coordinate systems can be determined by using the same method.

Figure 7:
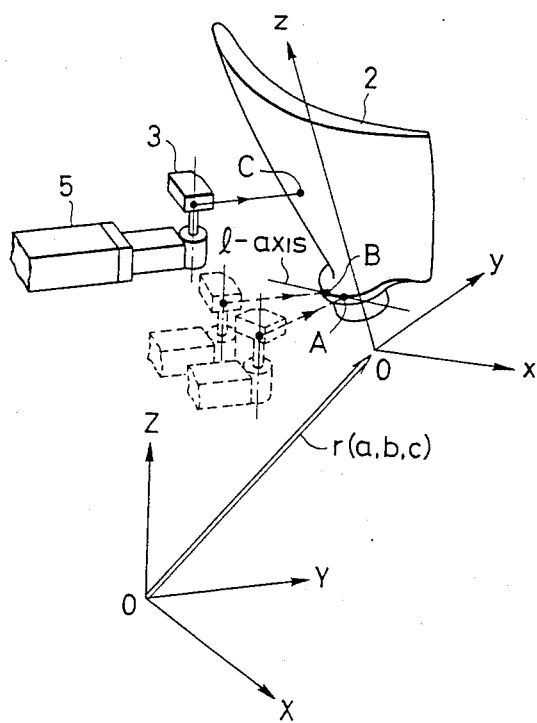
FIG. 7 is a perspective view of the part of the shape measuring apparatus and an object for explaining still other embodiments of the present invention in which three reference points are set.

A case where no axes of the object coordinate system and measuring coordinate system are parallel, with three different reference points, which are not on the same straight line, required to determine the linkage of the two coordinate systems will now be discussed. FIG. 7 shows an example of this case. In this example, no coordinate axes of the object coordinate system O-xyz are parallel to the coordinate axes of the measuring coordinate system O-XYZ. The reason why not less than three reference points are required in this case is that, if only two reference points A, B in the drawing are set, the posture of the object 2 cannot be determined definitely. Namely, if only two reference points are set, the object 2 is rendered rotatable around the l-axis passing the reference points A, B as shown in the drawing. In order to eliminate this inconvenience, it is necessary to add a third reference point C which is not on the l axis as shown in the drawing, and definitely determine the position and posture of the object 2. In this case, it is also necessary that the coordinate values $(x_A, y_A, z_A)$, $(x_B, y_B, z_B)$, $(x_C, y_C, z_Z)$ of these reference points A, B, C with respect to the object coordinate be determined in advance. The coordinate values $(X_A, Y_A, Z_A)$, $(X_B, Y_B, Z_B)$, $(X_C, Y_C, Z_C)$ of the reference points with respect to the measuring coordinate system are the measurement values obtained by applying a light spot from the light spot detecting sensor 3 to these reference points. It is understood that, when computation is made by using these coordinate values, the relative positional relation between these two coordinate systems, i.e. the quantities (a, b, c) of translational motion thereof, and the directions of the axes of the same coordinate systems can be determined.

A method of computing a manufacturing error by using an arithmetic control unit after the relative positional relation between the object coordinate system and measuring coordinate system has been determined will now be described with reference to the example shown in FIG. 6.

Let (x'p, y'p, z'p) equal the design values of the point P in FIG. 6 with respect to the object coordinate system O-x'y'z'. If the equations (3) are substituted by these values, the coordinates x'p, y'p, z'p of the point P are converted into coordinates $X_p$, $Y_p$, $Z_p$ with respect to the measuring coordinate system as expressed by the following equations. In these equations, a, b, c and $\alpha_z$ represent the values already determined by the linkage of the coordinate systems.

$$\left. \begin{array}{l} X_p = \cos\alpha_z x'_p - \sin\alpha_z y'_p + a \\ Y_p = \sin\alpha_z x'_p + \cos\alpha_z y'_p + b \\ Z_p = \phantom{\sin\alpha_z x'_p + \cos\alpha_z y'_p + {}} z'_p + c \end{array} \right\} \quad (4)$$

Let $(X_{p1}, Y_{p1}, Z_{p1})$ equal the coordinates in the measuring coordinate system, which are obtained by practically measuring the point P. The errors $(\Delta X, \Delta Y, \Delta Z)$ in the measuring coordinate system can then be determined in accordance with the following equations.

$$\left. \begin{array}{l} \Delta X = X_{p1} - X_p \\ \Delta Y = Y_{p1} - Y_p \\ \Delta Z = Z_{p1} - Z_p \end{array} \right\} \quad (5)$$

If the object is manufactured in accordance with the design values, $(\Delta X, \Delta Y, \Delta Z)$ in the equations (5) become zero, respectively. If the object is not manufactured in accordance with the design values, $(\Delta X, \Delta Y, \Delta Z)$ have values other than zero, respectively.

If the operational equations (4) and (5) are programmed in advance in the arithmetic control unit to output the results, the manufacturing errors can be automatically determined.

The following equation, in which a distance $\Delta l$ between the design points and measurement points is used, can be employed as an equation for computing the manufacturing error instead of the equation (5).

$$\Delta l = \sqrt{(\Delta X)^2 + (\Delta Y)^2 + (\Delta Z)^2} \quad (6)$$

In the above embodiment, a manufacturing error is obtained as values in the measuring coordinate system, but it can be obtained as values in the object coordinate system.

According to the present invention, the relative positional relation between an object coordinate system in which the shape of an object is expressed and a measuring coordinate system in which the movement of a shape determining apparatus is expressed can be determined, and a manufacturing error of the object can be determined simply and automatically by using the results of the operation for determining the mentioned relative positional relation.

What is claimed is:

1. A method of measuring the shape of an object in a non-contacting manner by using a shape-measuring apparatus including a light spot detecting sensor for measuring the distance between said object and said sensor in non-contacting manner by using a light spot, means for driving said light spot detecting sensor, an arithmetic and control unit adapted to receive signals representative of the distance measured by said light spot detecting sensor and the movement of said sensor driven by said driving means, subject said signals to computation and control the operations of said sensor and said driving means, comprising the steps of:

providing at least one reference point, of which the coordinate in an object coordinate system is already known, on an object to be measured, said object coordinate system being for defining the shape of said object;

driving said light spot detecting sensor so as to apply a light spot therefrom to said reference point and thereby determine the coordinate value of said reference point in a measuring coordinate system for determining the movement of said shape-measuring apparatus;

determining the relative positional relation between said two coordinate systems by said arithmetic control unit by using the coordinate values thus determined and the coordinate values in said object coordinate system;

measuring various points on said object by said light spot detecting sensor to determine the coordinate values corresponding to the various points measured;

comparing the measured values obtained in said measuring step with design values which correspond to the various points on said object and have been inputted into said arithmetic and control unit in advance, one of the measured and design values being modulated with the relative positional relation so as to be coordinate values in the same coordinate system.

2. The method as defined in claim 1, wherein said coordinate values obtained in said measuring step are ones in the measuring coordinate system, and said design values are the coordinate values which are converted into ones in the measuring coordinate system.

3. The method as defined in claim 2, wherein said light spot detecting sensor is moved three-dimensionally and the light emission angle from said sensor is varied according to the shape of said object.

4. The method as defined in claim 3, wherein in said reference point providing step, two reference points the coordinates of which are known in the object coordinate system are provided on an object to be detected, when the corresponding one coordinate axis is in parallel to each other in said two coordinate systems.

5. The method as defined in claim 3, wherein in said reference point providing step, three reference points of which the coordinate in said object coordinate system are known are provided on an object to be measured, in case where the corresponding three coordinate axes are not in parallel to each other in said two coordinate systems.

6. A method of determining the shape of an object in a non-contacting manner by using a shape-determining apparatus including a light spot detecting sensor for measuring the distance between said object and said sensor in a non-contacting manner by using a light spot, means for varying the angle of emission of the light from said light spot detecting sensor, and means, which has said angle-varying means secured thereto, and which is adapted for driving said light spot detecting sensor three-dimensionally, and an arithmetic and control unit adapted to receive signals representative of the distance determined by said light spot detecting sensor, the amount of movement of said sensor driven by said three-dimensional driving means and the angle of emission of the visible light spot from said sensor, subject said signals to computation and control the operations of said sensor and said driving means, comprising the steps of:

obtaining the relation between an object coordinate system for determining the shape of said object and a measuring coordinate system for determining the movement of said shape-determining apparatus, said relation obtaining step including the steps of providing one or a plurality of reference points, of which the coordinates in said object coordinate system are already known, on said object, driving said light spot detecting sensor so as to apply a visible light spot therefrom to said reference points and thereby determine the coordinate values in said measuring coordinate system of said reference points, and determining the relative positional relation between said two coordinate systems by said arithmetic control unit by using the coordinate values thus determined and the coordinate values in said object coordinate system;

measuring the positions of various points on said object by said light spot detecting sensor to determine the coordinate values corresponding to the various points measured; and comparing the coordinate values obtained in said measuring step with design values corresponding to said arithmetic and control unit in advance, said coordinate values in the measuring coordinate system of said design values in the object coordinate being converted into coordinate values in the same coordinate system before effecting the comparison, using said relative positional relation to determine a manufacturing error of said object.

7. A method of measuring the shape of an object in a non-contacting manner by using a shape-measuring apparatus having a light spot detecting sensor for emitting visible light on said object and measuring the distance between the light spot on said object and said light spot detecting sensor, driving means for three-dimensionally driving said light spot detecting sensor, angle-varying means for varying a light emission angle of said light spot detecting sensor, and an arithmetic and control unit adapted to receive signals representative of thhe distance measured by said light spot detecting sensor, the emission angle of said visible light, and the position of said light spot detecting sensor driven by said driving means, comprising the steps of:

providing at least one reference point, of which the coordinate in an object coordinate system is already known, on an object to be measured, said object coordinate system being for defining the shape of said object;

applying a visible light spot from said light spot detecting sensor to said reference point of said object through driving of said shape-measuring apparatus to measure the distance between the visible light spot on said object and said light spot detecting sensor;

determining the coordinate value of said reference point in a measuring coordinate system for determining the movement of said shape-measuring apparatus, through calculation of signals representative of said measured distance of said reference point and the position of said light spot detecting sensor;

determining the relative positional relation between said two coordinate systems by said arithmetic control unit by using the coordinate values thus determined and the coordinate values in said object coordinate system;

applying visible light spots to various points of said object, respectively, through operation of said shape-measuring apparatus to measure distances between said light spot detecting sensor and said various points of said object;

determining the coordinate values of said various points of said object by calculating signals representative of said measured various distances of said object, and the positions and light emission angles of said light spot detecting sensor at which said respective light spots are emitted;

effecting conversion between the object coordinate system and the measuring coordinate system by using said relative positional relation, with respect to the coordinate values of said various points obtained through the measurement and the coordinate values of design which are in the object coordinate system and correspond to the measured various points of the object, to obtain each of said coordinate values in the same coordinate system; and comparing the various coordinate values of said various points of said object obtained through the measurement with said coordinate values of said design values which have been stored in advance in said arithmetic and control unit, thereby to determine a manufacturing error of said object.

8. The method as defined in claim 7, wherein in said step of effecting coordinate system conversion, said coordinate values of said design values are converted into coordinate values in the measuring coordinate system so that said manufacturing error is calculated in the measuring coordinate system.

9. The method as defined in claim 7, wherein in said step of effecting coordinate system conversion, said coordinate values of said measured distances of said various points of said object are converted into coordinate values in the object coordinate system so that said manufacturing error is calculated in the object coordinate system.

10. The method as defined in claim 7, wherein in said reference point providing step, two reference points the coordinates of which are known in the object coordinate system are provided on an object to be detected, when the corresponding one coordinate axis is in parallel to each other in said two coordinate systems.

11. The method as defined in claim 7, wherein in said reference point providing step, three reference points of which the coordinate in said object coordinate system are known are provided on an object to be measured, in case where the corresponding three coordinate axes are not in parallel to each other in said two coordinate systems.

* * * * *